United States Patent
Tseng et al.

(10) Patent No.: US 11,424,708 B2
(45) Date of Patent: Aug. 23, 2022

(54) ESTIMATING METHOD FOR ESTIMATING ROTOR FREQUENCY OF MOTOR

(71) Applicant: DELTA ELECTRONICS, INC., Taoyuan (TW)

(72) Inventors: Shao-Kai Tseng, Taoyuan (TW); Yuan-Qi Hsu, Taoyuan (TW); Sheng-Han Wu, Taoyuan (TW); Sheng-Chieh Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/347,551

(22) Filed: Jun. 14, 2021

(65) Prior Publication Data

US 2021/0399665 A1 Dec. 23, 2021

(30) Foreign Application Priority Data

Jun. 17, 2020 (CN) .......................... 202010553273.4

(51) Int. Cl.
*H02P 23/08* (2006.01)

(52) U.S. Cl.
CPC .......... *H02P 23/08* (2013.01); *H02P 2207/01* (2013.01)

(58) Field of Classification Search
CPC ............................. H02P 23/08; H02P 2207/01
See application file for complete search history.

(56) References Cited

U.S. PATENT DOCUMENTS

| | | | | |
|---|---|---|---|---|
| 5,448,149 A * | 9/1995 | Ehsani | ..................... | H02P 1/163 318/400.01 |
| 9,442,029 B2 | 9/2016 | Wu et al. | | |
| 2005/0154545 A1 * | 7/2005 | Ramu | ................... | H02P 25/089 702/65 |
| 2009/0140681 A1 | 6/2009 | Hauttmann et al. | | |
| 2021/0159835 A1 * | 5/2021 | Zhang | ..................... | H02P 6/185 |

FOREIGN PATENT DOCUMENTS

| | | |
|---|---|---|
| CN | 1087587 A | 6/1994 |
| CN | 102299679 B | 12/2013 |
| CN | 103762913 A | 4/2014 |
| CN | 106787961 A | 5/2017 |
| CN | 108075707 A | 5/2018 |
| CN | 109565251 A | 4/2019 |
| TW | 226500 B2 | 7/1994 |
| TW | I246822 B | 1/2006 |
| WO | 2018/002077 A1 | 1/2018 |

* cited by examiner

*Primary Examiner* — Zoheb S Imtiaz

(74) *Attorney, Agent, or Firm* — CKC & Partners Co., LLC

(57) ABSTRACT

An estimation method for estimating a rotor frequency of a motor during freewheeling, includes: applying a fixed input voltage and one selected from a plurality of stator frequencies to the motor sequentially so as to perform frequency scanning; detecting a stator current value of the motor corresponding to the selected stator frequency; calculating a stator current slope of the stator current values sequentially; defining a target period from a start point where the stator current slope varies from positive to negative to an end point where the stator current slope varies from negative to positive; and determining that a difference between the scanned stator frequency and the rotor frequency is within a preset value, then designating any of the corresponding stator frequencies during the target period as an estimated value of the rotor frequency.

10 Claims, 7 Drawing Sheets

ESTIMATING METHOD FOR ESTIMATING ROTOR FREQUENCY OF MOTOR

RELATED APPLICATION

The present application claims priority to China Application Serial Number 202010553273.4, filed Jun. 17, 2020, which is incorporated herein by reference in its entirety.

BACKGROUND

Technical Field

The present disclosure relates to an estimating method for estimating rotor frequency of motor. More particularly, the present disclosure relates to an estimating method for estimating rotor frequency of motor during freewheeling.

Description of Related Art

In various applications of motors, in order to save energy, the motors are often accelerated or decelerated according to load conditions. In this process, when the motor is freewheeling, the rotor frequency of the motor at the running time must be estimated, so that a converter can perform proper speed chasing operation to control the motor to a target rotating speed. Otherwise, during the restart process, it may cause start failure or even damage the converter due to overvoltage and overcurrent.

Therefore, how to accurately estimate the rotor frequency of the motor during freewheeling is one of the important topics of the field.

SUMMARY

One aspect of the present disclosure is to provide an estimating method applied to a motor controlling system configured to estimate a rotor frequency of a motor during freewheeling. The motor controlling system includes a controller and a current sensor. The estimating method comprises: applying, by the controller, a fixed input voltage and a stator frequency selected from a plurality of stator frequencies to the motor sequentially so as to perform frequency scanning; detecting, by the current sensor, a stator current value of the motor corresponding to the stator frequency; calculating, by the controller, a stator current slope of the stator current value sequentially; defining, by the controller, a target period from a start point where the stator current slope varies from being positive to being negative to an end point where the stator current slope varies from being negative to being positive; and when performing frequency scanning, determining, by the controller, that a difference between the scanned stator frequency and the rotor frequency is within a preset value, then designating any one of the corresponding stator frequencies during the target period as an estimated value of the rotor frequency.

In summary, based on the characteristic that the stator current decreases when the slip becomes smaller, by applying the fixed input voltage and one frequency selected from the plurality of stator frequencies sequentially to perform frequency scanning, the target period can be defined according to the time points of the positive-negative transition of the stator current slope. Since it is determined that the scanned stator frequency is close to the rotor frequency in the target period, the estimated value of the rotor frequency can be obtained from the stator frequency designated at any point in the target period.

It is to be understood that both the foregoing general description and the following detailed description are by examples, and are intended to provide further explanation of the disclosure as claimed.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

Generally speaking, in order to accurately estimate a rotor frequency of a motor when it is freewheeling, the rotor frequency is usually calculated according to a parameter model of the motor according to the design or manufacture. However, in this method, the parameters must be set according to different sizes, types, and purposes of motors before applying an appropriate current command and voltage command to perform frequency scanning, and an input current and an input voltage must be continuously monitored during process of the scan. A longer estimation time may leads to more variations causing an inaccurate estimation. In addition, more complicated calculations may increase costs, and an estimated value cannot be obtained and compensated in real time, which causes delay.

In order to solve the above problems, the present disclosure uses an induction motor with V/f open-loop control. Without the need of motor parameters, an operating point where a stator frequency is close to a rotor frequency is determined by variation of a stator current slope so as to obtain the estimated value of the rotor frequency accordingly. Further details will be described in the following paragraphs, and the operating principle and parameter waveforms of the motor will be explained first.

Figure 1A:
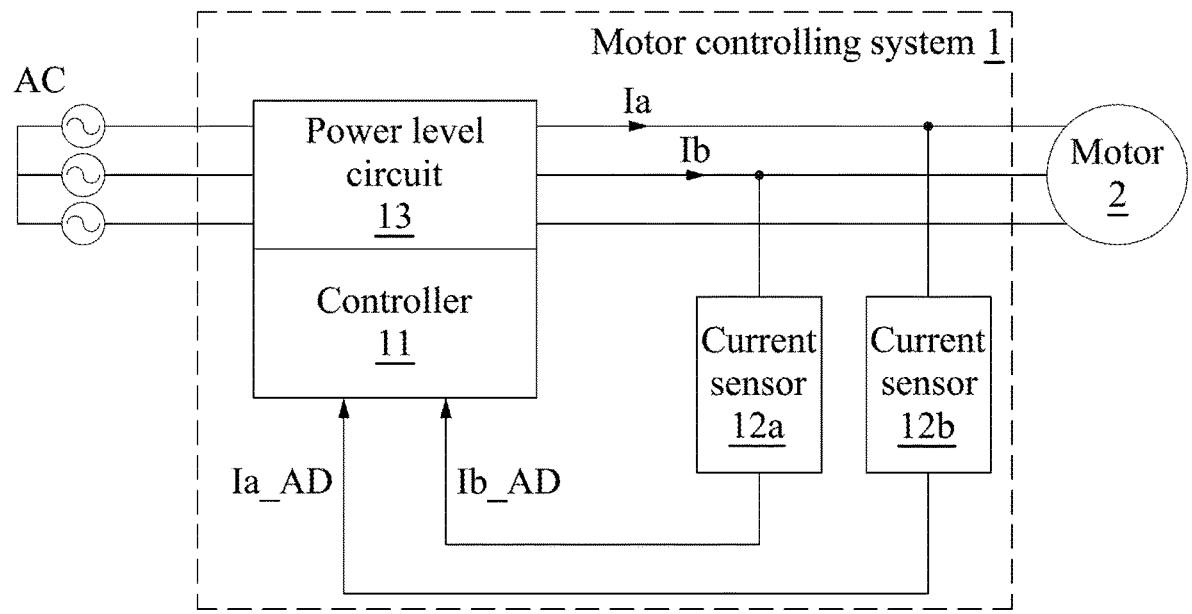
FIG. 1A is a schematic diagram of a system with a motor controlling system electrically connected to a motor, in accordance with some embodiments of the present disclosure.
Figure 1B:
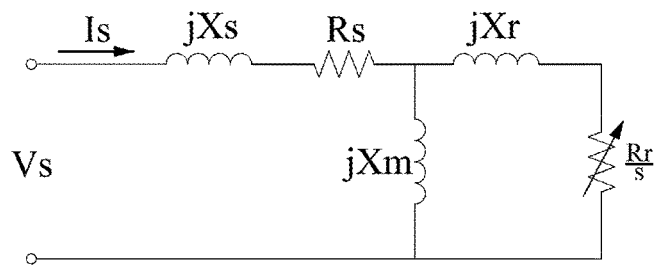
FIG. 1B is an equivalent circuit diagram of the motor according to some embodiments of FIG. 1A.

Reference is now made to FIG. 1A and FIG. 1B. FIG. 1A is a schematic diagram of a system with a motor controlling system 1 electrically connected to a motor 2, in accordance with some embodiments of the present disclosure. FIG. 1B is an equivalent circuit diagram of the motor 2 according to some embodiments of FIG. 1A. As shown in FIG. 1A, a motor controlling system 1 is electrically connected to a motor 2. The motor controlling system 1 is configured to control the motor 2. The motor controlling system 1 comprises at least a controller 11, current sensors 12a, 12b and a power stage circuit 13. In some embodiments of the present disclosure, the motor controlling system 1 is, for example, a converter, and the motor 2 is, for example, an asynchronous motor or an induction motor. The motor controlling system 1 receives an external input power AC, which is converted to an output power by the power stage circuit 13 and is provided to the motor 2. In the operation process, the current sensors 12a, 12b detect feedback current Ia of a-phase and feedback current Ib of b-phase, respectively, and the feedback currents Ia, Ib are converted to two-phase feedback currents Ia_AD, Ib_AD, respectively, after an analog-to-digital conversion. The two-phase feedback currents Ia_AD, Ib_AD are provided to the controller 11 for calculating a stator current Is of the motor 2. Further details will be explained in the following paragraphs.

As shown in FIG. 1B, Vs is a stator voltage, Is is a stator current, jXs is a stator leakage inductance, Rs is a stator resistor, jXm is a magnetizing inductance, jXr is a rotor leakage inductance, Rr is a rotor resistor, and s is a slip, in which the slip s is defined as the formula (1) below.

$$s = \frac{n_s - n_r}{n_s} \quad (1)$$

In the case of asynchronous motor, the stator coil uses electromagnetic induction to induce induction current of the rotor, and then outputs a torque to make the motor rotate. In order to generate the rotor current, an actual rotation speed (e.g., $n_r$ in the formula (1)) of the rotor will be slower than a rotation speed (e.g., $n_s$ in the formula (1)) of a magnetic field of the stator, and a ratio of a difference between the two rotation speeds to the actual rotation speed is called the slip s. Therefore, from FIG. 1B and the formula (1), it can be known that when a stator frequency Fs approaches a rotor frequency Fr, the slip s becomes smaller, and an equivalent impedance of the motor 2 becomes larger.

Figure 2A:
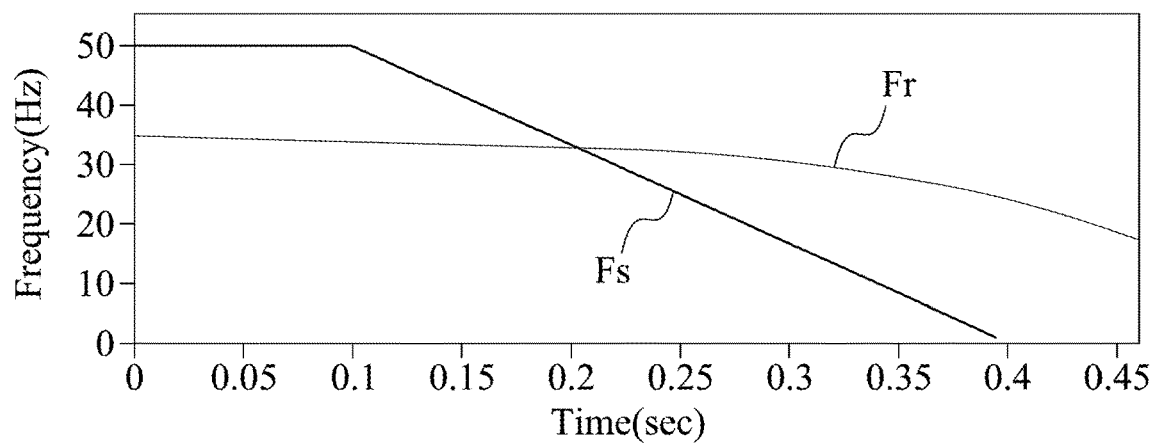
FIGS. 2A-2E and FIGS. 3A-3B are schematic diagrams of waveforms for various motor parameters, in accordance with some embodiments of the present disclosure.
Figure 2B:
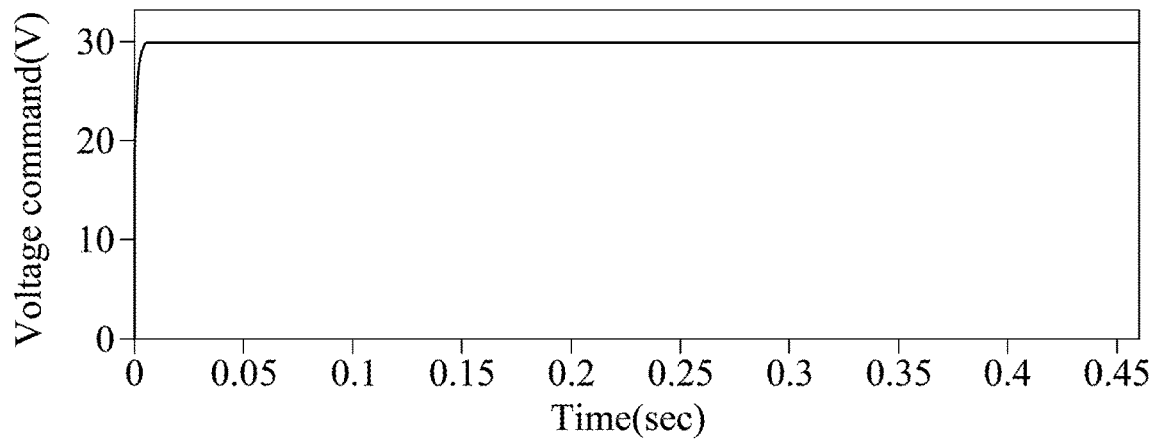
Figure 2C:
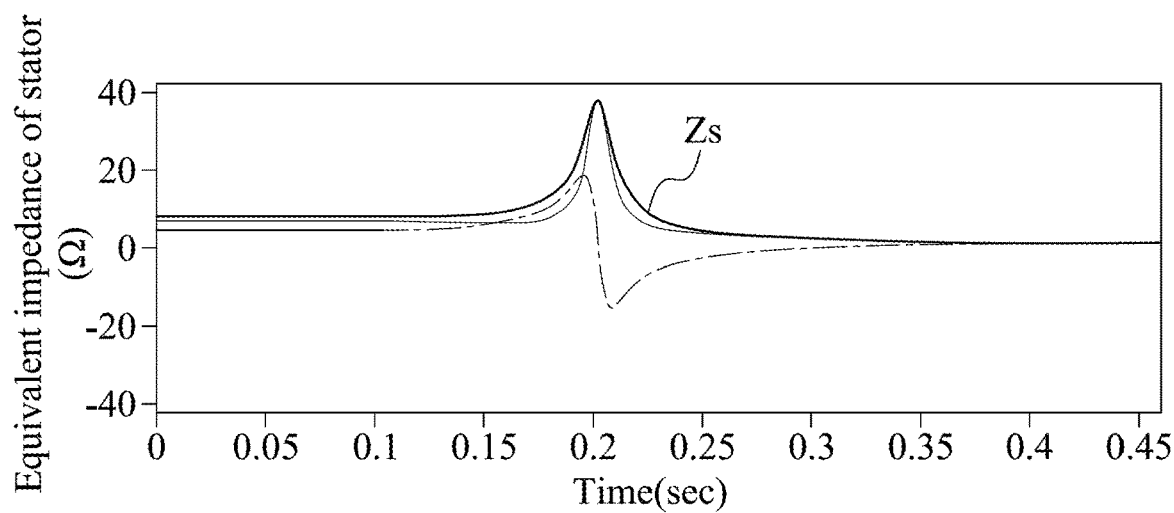
Figure 2D:
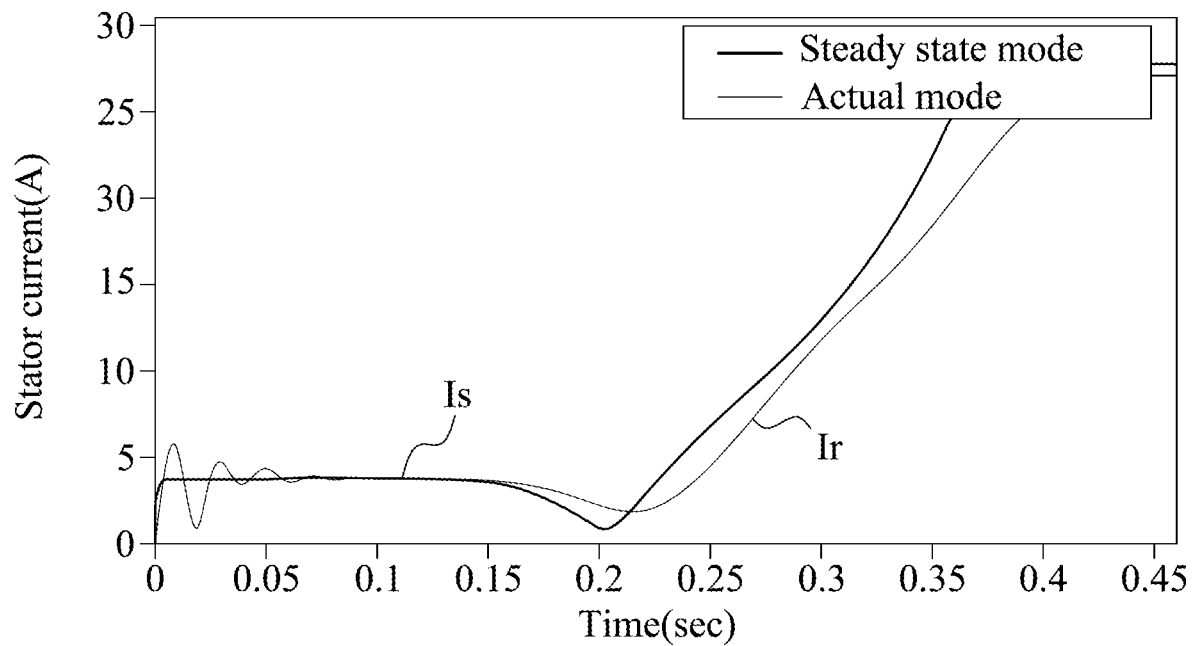
Figure 2E:
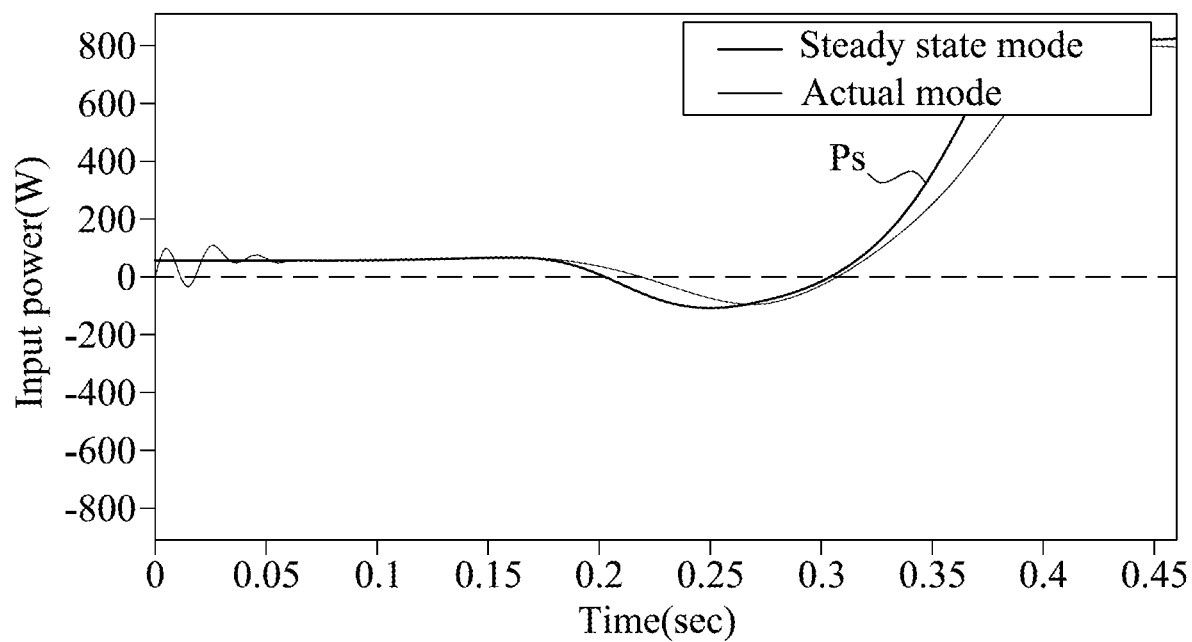

Reference is now made to FIGS. 2A-2E and FIGS. 3A-3B. FIGS. 2A-2E and FIGS. 3A-3B are schematic diagrams of waveforms for various motor parameters, in accordance with some embodiments of the present disclosure. Specifically, in this embodiment, the controller 11 applies a fixed (value) voltage command, and selects one stator frequency Fs from a plurality of different stator frequencies Fs to sequentially apply to the stator via a converter so as to perform frequency scanning. For instance, the controller 11 firstly applies a fixed input current command to the motor 2 until the motor 2 reaches a steady state, and uses the steady state voltage (e.g., 30 V as shown in FIG. 2B) as the fixed voltage command. Next, different frequencies (e.g., 50 Hz-0 Hz as shown in FIG. 2A) are sequentially selected and applied to the stator to perform frequency scanning.

Since when the slip s is smaller than zero (i.e., the stator frequency Fs is smaller than the rotor frequency Fr), the motor 2 is operated in a generator mode. Therefore, in order to avoid storing energy on a DC-link capacitor at the beginning of frequency scanning, the frequency will be scanned from high to low in order to ensure safety. Furthermore, in this embodiment, each scanning time period is less than 0.4 seconds. For instance, time required for one operation of frequency scanning may be, but not limited to, about 0.3 seconds, and can be adjusted according to needs.

In the frequency scanning process, as shown in FIGS. 2A-2E, the stator frequency Fs will gradually approach the rotor frequency Fr until the two are equal, and then gradually move away from each other in value. When the stator frequency Fs gradually approaches the rotor frequency Fr, since the slip s becomes smaller, an equivalent impedance Zs of the stator increases, and the stator current Is decreases, as shown between the time at 0.1 seconds and 0.2 seconds as shown. Next, when the stator frequency Fs is equal to the rotor frequency Fr, the equivalent impedance Zs of the stator reaches a maximum value, and the stator current Is reaches a minimum value, as shown at the 0.2 seconds. Furthermore, an input power Ps at the running time is zero. Next, when the stator frequency Fs is lower than and further away from the rotor frequency Fr, the equivalent impedance Zs of the stator decreases, and the stator current Is increases, as shown after the time at 0.2 seconds. The time aforementioned, the 0.2 seconds, may be defined as the time when the input power Ps crosses a zero point. When performing frequency scanning, the aforementioned stator current Is reaching the minimum value or the input power Ps crossing the zero point can be used as a trigger condition to compensate the estimated value of the motor 2. When the stator frequency Fs approaches the rotor frequency Fr, such that the difference between them is less than a preset value, and the preset value is, for example, 2.5 Hz, which can be adapted as a criterion for judgment or determination.

It may be seen from the above description that value of the rotor frequency Fr may be approximate estimated according to a close value, such as slightly higher or lower than the stator frequency Fs, when the equivalent impedance Zs of the stator reaches the maximum value (i.e., the stator current Is reaches the minimum value).

Figure 3A:
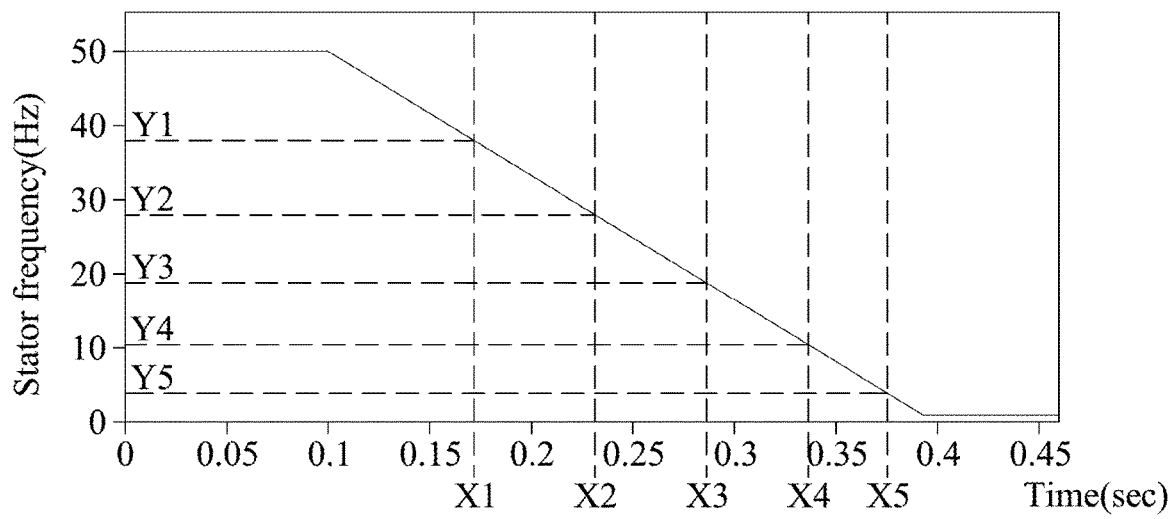
Figure 3B:
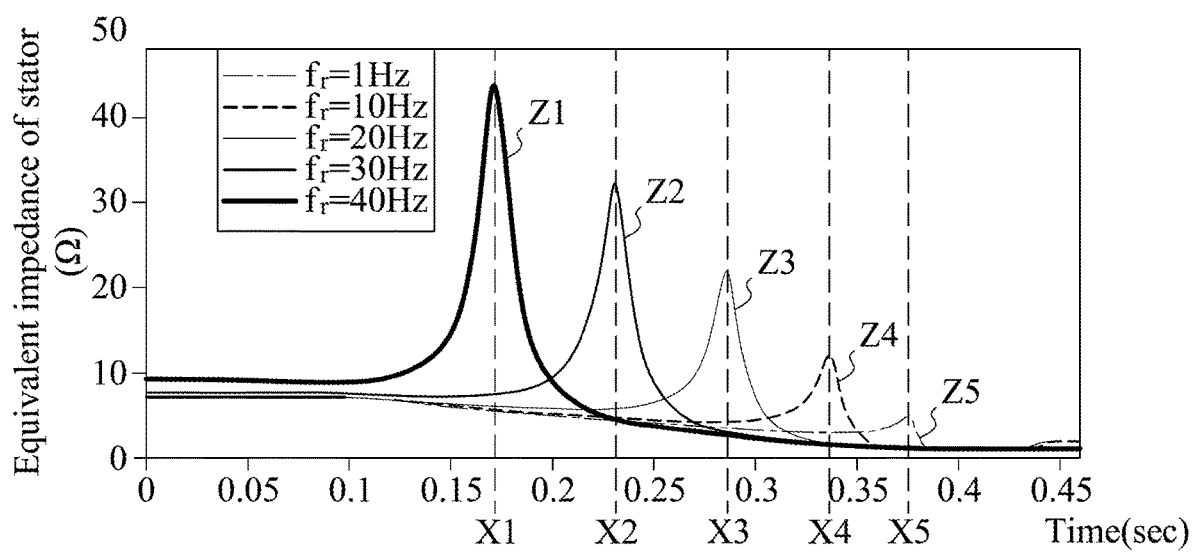

As also shown in FIGS. 3A-3B, equivalent impedances Z1-Z5 of the stator are results of scanning the rotor frequencies of 40 Hz, 30 Hz, 20 Hz, 10 Hz and 1 Hz, respectively. As shown in FIGS. 3A-3B, time points for the equivalent impedances Z1-Z5 of the stator reaching the highest points are X1-X5, respectively. The rotation speeds Y1-Y5 of the stator corresponding to the time points X1-X5 are approximate in line with the rotor frequencies of 40 Hz, 30 Hz, 20 Hz, 10 Hz and 1 Hz, respectively.

In other words, by applying the fixed voltage command and different selected frequencies to the stator sequentially for performing frequency scanning, detecting the minimum value of the stator current and calculating the stator current slope accordingly, a time interval of the stator frequency closed to the rotor frequency can be determined so as to obtain the estimated value of the rotor frequency.

Figure 4:
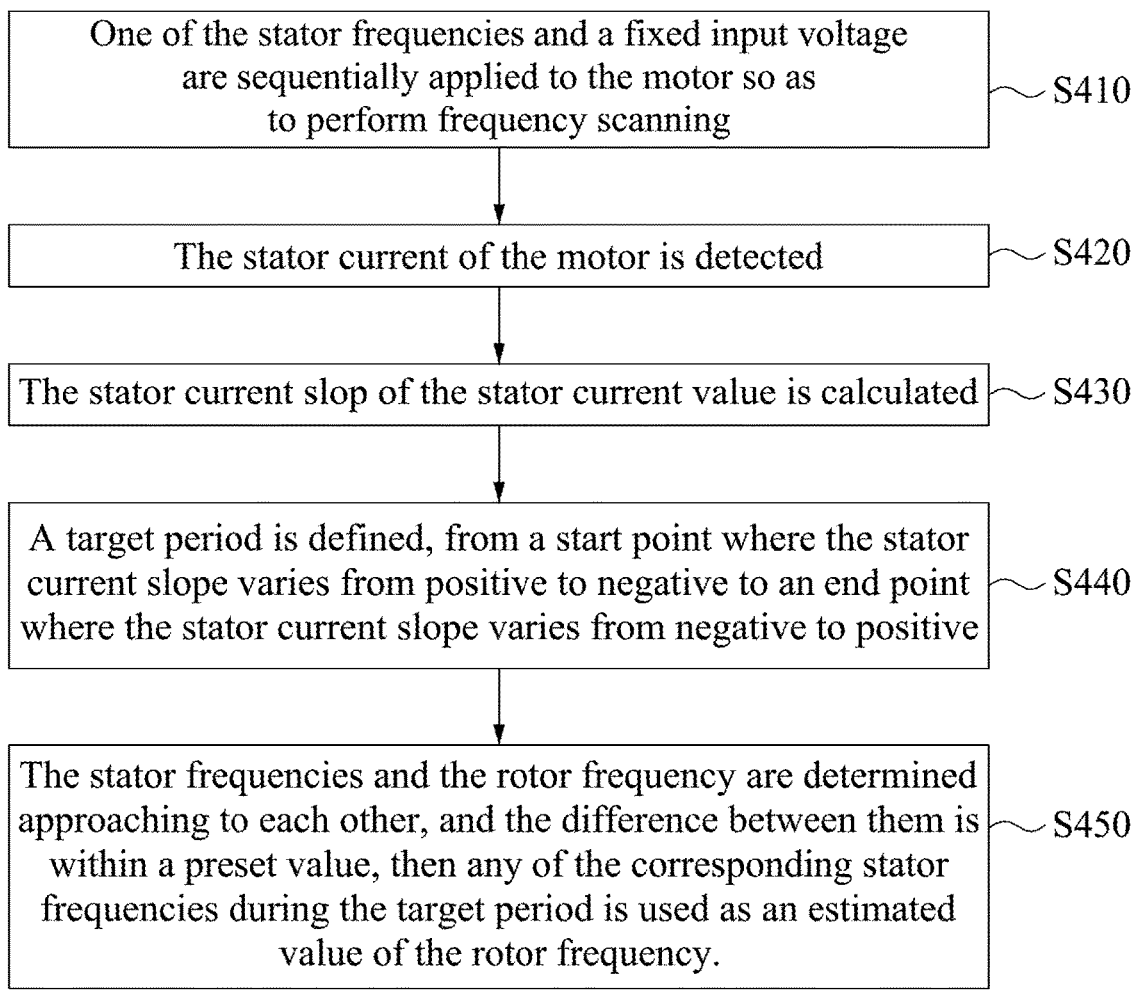
FIG. 4 is a flow chart of an estimating method, in accordance with some embodiments of the present disclosure.

Reference is now made to FIG. 4. FIG. 4 is a flow chart of an estimating method 400, in accordance with some embodiments of the present disclosure. For the ease and clarity of illustration, the estimating method 400 mentioned below is described in the following paragraphs by referring to the embodiments shown in FIG. 5, but is not limited as such. Any person skilled in the art may have various modification and alteration to the embodiments without departing from the spirits and scope of the present application. As shown in FIG. 4, the estimating method 400 includes operations S410, S420, S430, S440 and S450.

Figure 5:
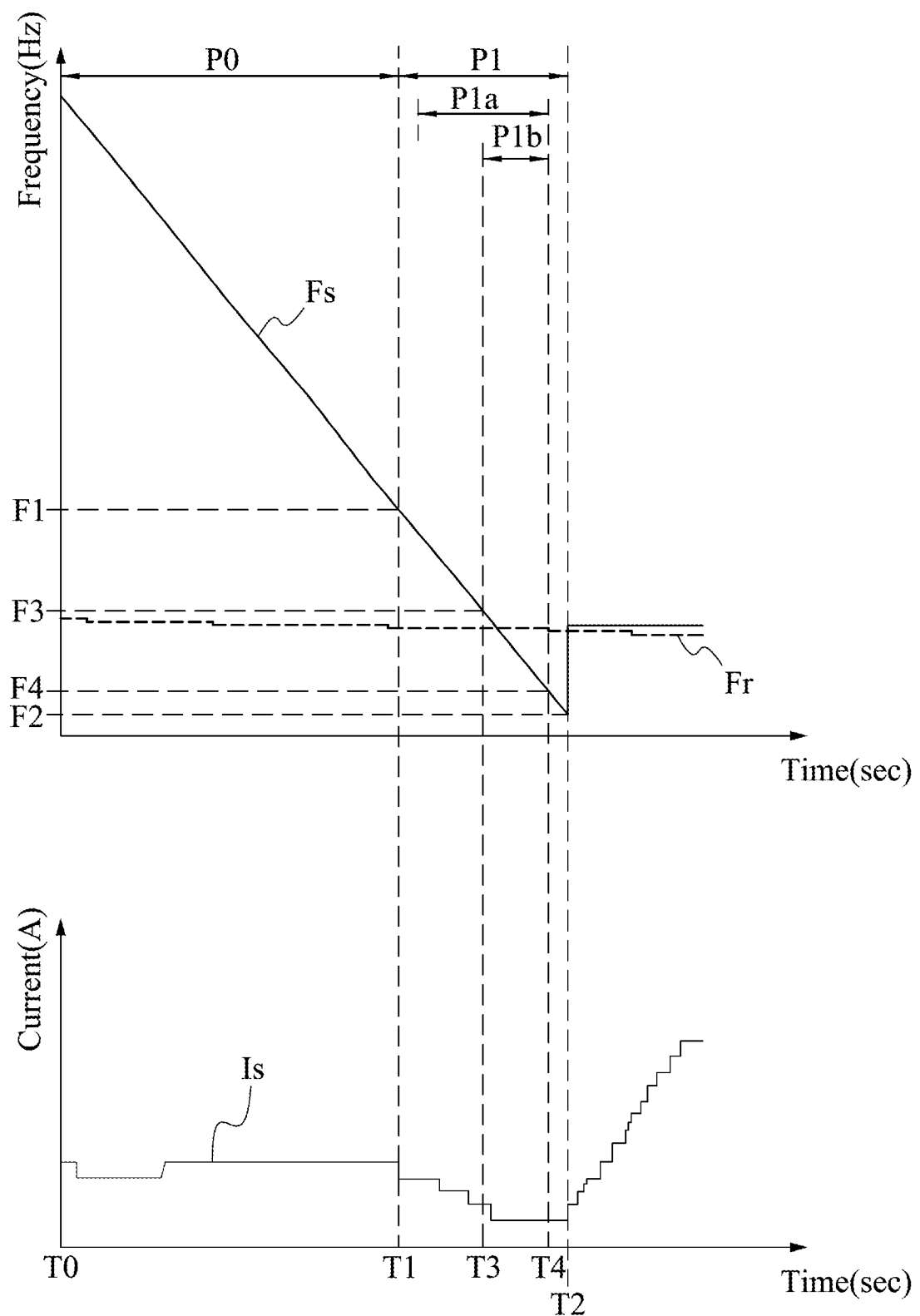
FIG. 5 is a schematic diagram of a waveform for an estimating parameter, in accordance with some embodiments of the present disclosure.

First, in operation S410, the controller 11 applies one selected from a plurality of stator frequencies Fs and a fixed input voltage to the motor 2 sequentially so as to perform frequency scanning. Specifically, as shown in FIG. 5, during the time period of a time point T0 to a time point T2, the controller 11 sequentially selects the stator frequencies Fs in descending order to input to the motor 2 for performing frequency scanning. Furthermore, in some embodiments, in order to avoid an excessive current of frequency scanning producing a torque that affects the rotation speed of the rotor, the controller 11 sets the current command to 20% of a rated current value of the motor 2, and uses a voltage value acquired when the stator current Is reaching the steady state as the fixed input voltage, so as to ensure that the stator current Is keeps increasing (e.g., the stator current Is keeps increasing during time period P0) before the stator frequency Fs approaches the rotor frequency Fr. It should be noted that the magnitude of the current command is only an example for convenience, and is not limited thereto.

Next, in operation S420, the current sensor 12 detects the stator current Is of the motor 2. Specifically, the stator current Is is detected during the frequency scanning operation period. In some embodiments, from the beginning to the end of the estimating method 400, the stator current Is of the motor 2 can be detected at any time.

Next, in operation S430, the controller 11 calculates the stator current slope of the stator current Is sequentially. Specifically, during the frequency scanning operation period, the instantaneous stator current slope for the running time is calculated based on the stator current value of the running time and a previous time. For instance, the sequentially detecting is performed at a frequency of sampling once every 100 microseconds, and the stator current Is of a present one (hereinafter referred to as the running time) is compared with the stator current Is of a previous one (hereinafter referred to as the previous time). If the stator current of the running time is smaller than the stator current of the previous time, the stator current slope for the running time is smaller than zero, and is a negative value. If the stator current of the running time is larger than the stator current of the previous time, the stator current slope for the running time is larger than zero, and is a positive value. In some other embodiments, a mean value of the stator currents for present N times (i.e., multiple sampling times including the running time) is compared with a further mean value of the stator currents for previous N times (i.e., multiple sampling times including previous time). N is a positive integer greater than one. For instance, the N stator current values around each time point T3 and T1 in FIG. 5 are acquired, and the mean values are calculated, respectively, for conducting comparison. As shown in FIG. 5, the mean value corresponding to the time point T3 is smaller than the mean value corresponding to the time point T1, therefore, the stator current slope can be determined smaller than zero. In addition to using numbers of data as a sampling standard for calculating the mean value, the stator current values obtained by sequentially performing frequency scanning within a preset time period can also be averaged. For instance, in a first time period (e.g., a period of time including time point T1 in FIG. 5), the frequency scanning operation is sequentially performed to calculate a first mean value, and in a second time period (a period of time including time point T3 in FIG. 5), the frequency scanning operation is sequentially performed to calculate a second mean value. Then, the first mean value is compared with the second mean value to determine whether the stator current slope is positive or negative. The start point of the first time period is earlier than the start point of the second time period (e.g., the time point T1 is earlier than the time point T3). In some embodiments, the first time period may overlap the second time period partially. Take detecting once every 100 microseconds as an example, the first time period may be the 0-1,000 microseconds, and the second time period may be the 500-1,500 microseconds. The stator current values detected ten times for each are averaged, and whether the stator current slope is positive or negative is determined based on the magnitude. The first time period and the second time period may overlap in the 500-1,000 microseconds. It should be noted that the sampling frequencies mentioned above are only an example for convenience, and are not limited thereto. It also should be noted that definition for the positive stator current slope or the negative stator current slope is similar in multiple calculating methods aforementioned, and thus those descriptions will not be repeated here.

Next, in operation S440, the controller 11 uses a start point where the stator current slope varies from being positive to being negative, and an end point where the stator current slope varies from being negative to being positive, in which the start point and the end point cooperatively define a target period. In other words, the target period is a period from a time point the stator current slope becomes smaller than zero to a time point the stator current slope becomes greater than zero, i.e., the stator current slope is always negative during the target period.

Specifically, as stated in the above paragraph, the equivalent impedance Zs of the stator increases, and the stator current Is decreases as the stator frequency Fs approaching the actual rotor frequency Fr. Therefore, when the stator current slope starts to vary from being positive to being negative, it means that the equivalent impedance Zs of the stator starts to rise up, i.e., the stator frequency Fs approaches the actual rotor frequency Fr. Therefore, the start point of the target period (e.g., the time point T1 in FIG. 5) is where the stator current slope varies from being positive to being negative.

And as described in the above paragraph, in theory, when the stator frequency Fs equals to the actual rotor frequency Fr, the equivalent impedance Zs of the stator reaches the maximum value, and the stator current Is reaches the minimum value. Therefore, when the stator current slope starts to vary from being negative to being positive, it means that the highest point of the equivalent impedance Zs of the stator has passed, i.e., the stator frequencies Fs have begun to be smaller than the actual rotor frequency Fr. Therefore, the end point of the target period (e.g., the time point T2 in FIG. 5) is where the stator current slope varies from being negative to being positive.

In this way, it can be determined that the stator frequencies Fs in the target period (e.g., a time period P1 in FIG. 5) are generally close to the rotor frequency Fr by time points where the stator current slope varies between being positive and being negative values.

At last, in operation S450, the stator frequencies Fs corresponding to one of the target period are all close to the rotor frequency Fr, such that, when performing frequency scanning, the controller 11 firstly determines that the stator frequency Fs and the rotor frequency Fr approaches to each other, and the difference between them is smaller than a preset value, where the preset value is, for example, 2.5 Hz. Then any one of the stator frequencies Fs determined corresponding to the target period is suitable to be designated as the estimated value of the rotor frequency. In a preferred embodiment, when performing frequency scanning, the controller 11 designates the stator frequency Fs corresponding to a middle point in the target period as an estimated value of the rotor frequency Fr. Generally speaking, the stator current slope declination will be started to slow down at the middle point in the target period. In particular, as shown in FIG. 5, any time point in the time period P1 may be selected as an operating point. The stator frequency Fs corresponding to the operating point (i.e., one corresponding between frequency F1 to frequency F2) is designated as the estimated value of the rotor frequency Fr. In other words, after time point T2, the stator frequency Fs corresponding to the time point T2 (i.e., frequency F2) added by a compensation value is designated as the estimated value of the rotor frequency Fr. The compensation value is a difference between the stator frequency Fs that corresponds to the operating point (i.e., one of the values between frequency F1 to frequency F2) and frequency F2.

In further detail, from the diagram of waveforms for the stator frequency Fs and the actual rotor frequency Fr (e.g., FIG. 2A), it can be seen that although ideally when the stator frequency Fs is equal to the rotor frequency Fr, the stator current Is should be the minimum value. However, in practice, the time point for the stator current Is reaching the minimum value may be delayed due to signal latency caused by a transition state or a wave filtering, as the stator current Ir shown in FIG. 2D. Therefore, if the controller 11 uses a time point of the stator current, detected by the current sensor 12, reaching the minimum value as the operating point, the estimated value will be lower than the actual rotor frequency Fr.

In the embodiment of FIG. 5, when the stator current Is just begins to decrease (e.g., at time point T1), the stator frequency Fs is not closest to the rotor frequency Fr. Furthermore, due to signal latency, when the stator current Is reaches the minimum value (e.g., at time point T2), the stator frequency Fs is also not closest to the rotor frequency Fr. Therefore, the operating point may be selected at another time point which is not near time point T1 nor near time point T2 in the time period P1, such as one of time points in a time period P1a.

For instance, in some embodiments, the operating point may be selected at a middle point of the time period P1, such as time point T3. The stator frequency Fs corresponding to time point T3 (i.e., frequency F3) is designated as the estimated value of the rotor frequency Fr. In such a case, the declination of the stator current Is begins to be gradually slowed down, or the declination of the stator current slope begins to be gradually slowed down. Or, in other embodiments, the operating point may be selected at a time point near the middle point in a second half of the time period P1, such as one of time points in the time period P1b, i.e., one starting at time point T3 but not exceeding time point T4, in order to avoid the estimation affected by the signal latency aforementioned. The stator frequency Fs corresponding to a time point in the time period P1b (i.e., one corresponding between frequency F3 and frequency F4) is designated as the estimated value of the rotor frequency Fr.

In this way, by using the characteristic that when the stator frequency is close to the rotor frequency, the equivalent impedance of a motor will rise up, and the stator current will drop down, a fixed input voltage with different rotor frequencies are applied to the stator sequentially so as to perform frequency scanning. Then, the target period for the stator frequency approaching the rotor frequency can be speculated by a time point where the stator current slope varies between being positive and being negative, and the appropriate operating point is selected to obtain the estimated value of the rotor frequency. In such a case, the scanned stator frequency Fs approaches the rotor frequency Fr, and the difference between them is within a preset value, in which the preset value is, for example, 2.5 Hz.

Figure 6:
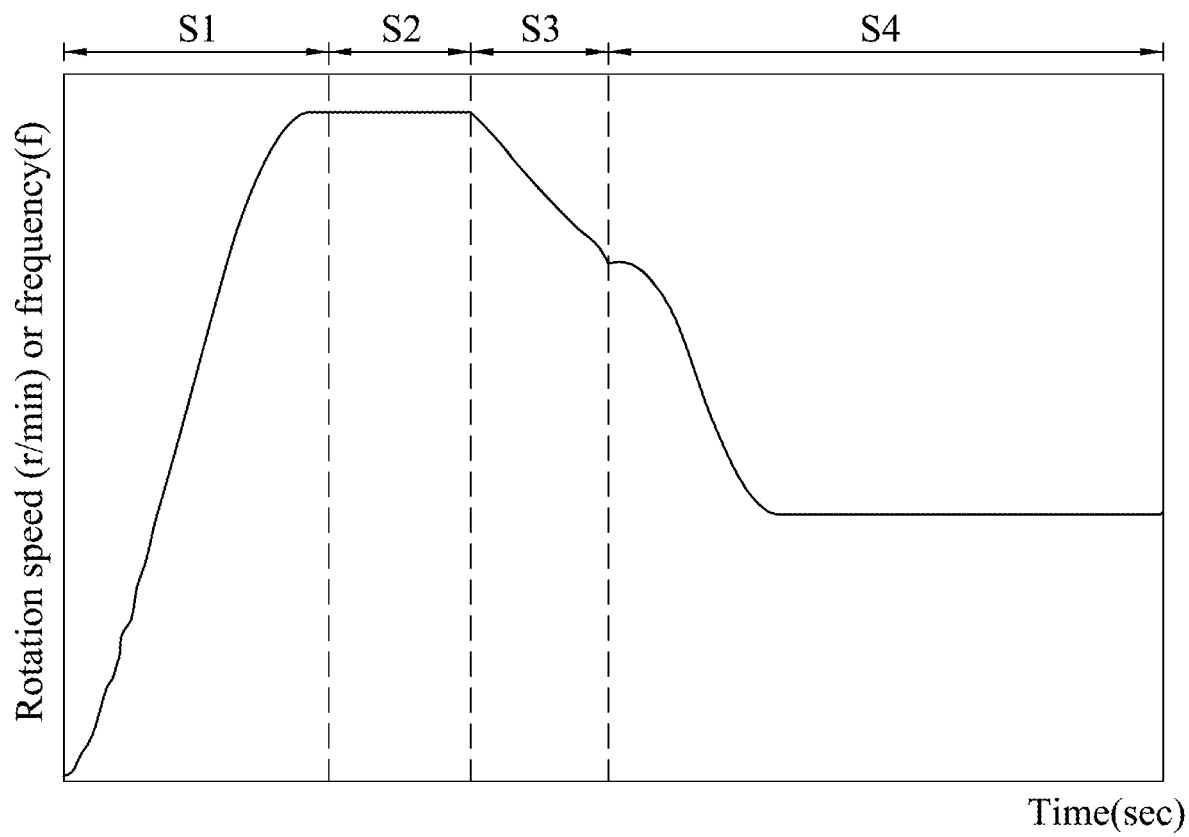
FIG. 6 is a schematic diagram of a waveform of motor speed versus time, in accordance with some embodiments of the present disclosure.

Reference is now made to FIG. 6. FIG. 6 is a schematic diagram of a waveform of motor speed versus time, in accordance with some embodiments of the present disclosure. As shown in FIG. 6, in stage S1, the motor 2 accelerates from still to a rated speed. In stage S2, the motor 2 operates on main supply. In stage S3, when the main supply is cut off, the motor 2 is freewheeling. In such a case, the estimating method 400 can be used to estimate the actual rotation speed of the rotor so as to obtain the estimated value of the rotor frequency Fr. In stage S4, a converter or the controller 11 of the present disclosure may conduct speed chasing operation according to the estimated value of the rotor frequency Fr. In this way, in stage S4, the motor 2 can be slowed down to a target lower speed.

Although the present disclosed methods are shown and described herein as a series of steps or events, it should be understood that the sequence of these steps or events shown should not be construed in a limiting sense. For example, some steps may occur in a different order and/or simultaneously with other steps or events other than the steps or events shown and/or described herein. Furthermore, when implementing one or more aspects or the embodiments described herein, not all the steps shown here are necessary. In addition, one or more steps in the present disclosure may also be executed in one or more separate steps and/or stages.

Based on the above, the present disclosure applies various embodiments mentioned above by applying the characteristic that the stator current will decrease when the slip becomes smaller. By applying the fixed input voltage and scanning with multiple stator frequencies, it is possible to determine the target period where the stator frequency approaches the rotor frequency according to the time points of the stator current slop varying between being positive and being negative in order to obtain the estimated value of the rotor frequency. Without the need to use motor parameters, the estimation time is effectively shortened, and the accuracy of the estimation is higher.

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present invention cover modifications and variations of this invention provided they fall within the scope of the following claims.

What is claimed is:

1. An estimating method applied to a motor controlling system configured to estimate a rotor frequency of a motor during freewheeling, wherein the motor controlling system comprises a controller and a current sensor, and the estimating method comprises:

applying, by the controller, a fixed input voltage and a stator frequency selected from a plurality of stator frequencies to the motor sequentially so as to perform frequency scanning;

detecting, by the current sensor, a stator current value of the motor corresponding to the stator frequency;

calculating, by the controller, a stator current slope of the stator current value sequentially;

defining, by the controller, a target period from a start point where the stator current slope varies from being positive to being negative to an end point where the stator current slope varies from being negative to being positive; and when performing frequency scanning, determining, by the controller, that a difference between the scanned stator frequency and the rotor frequency is smaller than a preset value, then designating the stator frequency at any one of time points corresponding to the target period as an estimated value of the rotor frequency.

2. The estimating method of claim 1, wherein the controller is configured to designate the stator frequency at middle point of the target period which is applied to the motor as the estimated value.

3. The estimating method of claim 1, wherein when the controller performs frequency scanning, the stator frequency applied to the motor at a first time period is designated as the estimated value, and the first time period is located in a second half of the target period.

4. The estimating method of claim 3, wherein when the controller performs frequency scanning, the stator frequency applied to the motor at a second time period is designated as the estimated value, and the second time period is located in the middle of the target period.

5. The estimating method of claim 1, wherein when the controller performs frequency scanning, the stator frequencies are sequentially selected in descending order and applied to the motor.

6. The estimating method of claim 1, wherein the fixed input voltage is a voltage value of the motor reaching a steady state after the controller applying a current command to the motor, and the current command corresponds to twenty percent of a rated current value of the motor.

7. The estimating method of claim 1, wherein the preset value is 2.5 Hz.

8. The estimating method of claim 2, wherein when the controller performs frequency scanning, each scanning time period is less than 0.4 seconds.

9. The estimating method of claim 1, wherein calculating the stator current slope comprises:
when the controller performs frequency scanning, comparing a first mean value from a plurality of stator current values for a running time with a second mean value from a plurality of stator current values for a previous time;
if the first mean value is smaller than the second mean value, the controller determining that the stator current slope for the running time is a negative value; and
if the first mean value is larger than the second mean value, the controller determining that the stator current slope for the running time is a positive value.

10. The estimating method of claim 9, wherein the controller is configured to perform frequency scanning in a first time period so as to calculate the first mean value, and is configured to perform frequency scanning in a second time period so as to calculate the second mean value, wherein the first time period overlaps the second time period partially.

* * * * *